(12) United States Patent
Tower

(10) Patent No.: US 10,986,815 B2
(45) Date of Patent: Apr. 27, 2021

(54) DOG GROOMING CLAMP

(71) Applicant: Tracy Tower, Vicksburg, MS (US)

(72) Inventor: Tracy Tower, Vicksburg, MS (US)

( * ) Notice: Subject to any disclaimer, the term of this patent is extended or adjusted under 35 U.S.C. 154(b) by 435 days.

(21) Appl. No.: 15/394,529

(22) Filed: Dec. 29, 2016

(65) Prior Publication Data
US 2017/0181405 A1 Jun. 29, 2017

Related U.S. Application Data

(60) Provisional application No. 62/272,211, filed on Dec. 29, 2015.

(51) Int. Cl.
| | |
|---|---|
| *A01K 15/04* | (2006.01) |
| *F16B 2/06* | (2006.01) |
| *F16B 2/18* | (2006.01) |
| *A01K 13/00* | (2006.01) |
| *A01K 1/04* | (2006.01) |

(52) U.S. Cl.
CPC ............ *A01K 15/04* (2013.01); *A01K 1/04* (2013.01); *A01K 13/00* (2013.01); *F16B 2/065* (2013.01); *F16B 2/185* (2013.01)

(58) Field of Classification Search
CPC .......... A01K 15/04; A01K 1/04; A01K 13/00; F16B 2/065; F16B 2/185; B25B 5/067; B25B 5/101; B25B 5/82
USPC ................................................ 269/143, 249
See application file for complete search history.

(56) References Cited

U.S. PATENT DOCUMENTS

| | | | | |
|---|---|---|---|---|
| 419,379 | A * | 1/1890 | Talbot ...................... | A61G 7/05 248/229.15 |
| 2,564,389 | A * | 8/1951 | Boehm ................... | A01K 65/00 43/55 |
| 4,790,049 | A * | 12/1988 | Grosh .................... | F16G 11/101 24/132 WL |
| 4,828,210 | A * | 5/1989 | Anderson ................ | A01K 1/04 119/797 |
| 7,073,754 | B2 * | 7/2006 | Shuey ..................... | E04B 9/006 248/328 |
| 8,365,685 | B2 | 2/2013 | Simons | |
| 8,925,496 | B2 | 1/2015 | Simons | |
| 9,538,723 | B2 | 1/2017 | Simons | |
| 9,877,464 | B2 | 1/2018 | Simons | |

(Continued)

FOREIGN PATENT DOCUMENTS

WO 2015175294 A1 11/2015

*Primary Examiner* — Lee D Wilson
*Assistant Examiner* — Thomas Raymond Rodgers
(74) *Attorney, Agent, or Firm* — Boudwin Intellectual Property; Daniel Boudwin

(57) ABSTRACT

A dog grooming clamp. The dog grooming clamp has a base member, two parallel and opposing arms extending from either end of the base member, and a third arm with a threaded aperture that is perpendicularly attached to a first arm. A hollow channel extends along the entire length of the base member. A handle is pivotally attached to a second arm and designed to push a pin into the channel when rotated in a first direction, such that when a rope is positioned within the channel, the pin pushes the rope against the channel, locking it in place. The rope can be easily released by rotating the handle in an opposing direction. A threaded rod is inserted within the threaded aperture and is used to easily attach the dog grooming clamp to a pole.

11 Claims, 4 Drawing Sheets

(56) References Cited

U.S. PATENT DOCUMENTS

2016/0242386 A1    8/2016  Simons
2016/0265623 A1*  9/2016  Kingery ................. F16G 11/12

\* cited by examiner

DOG GROOMING CLAMP

CROSS REFERENCE TO RELATED APPLICATIONS

This application claims the benefit of U.S. Provisional Application No. 62/272,211 filed on Dec. 29, 2015. The above identified patent application is herein incorporated by reference in its entirety to provide continuity of disclosure.

BACKGROUND OF THE INVENTION

The present invention relates to a dog grooming clamp. More specifically, the present invention relates to a dog grooming clamp that is designed to be secured to a groomer's pole and can easily lock and unlock a rope positioned therein.

Grooming a dog, which can include trimming, brushing, and bathing, is one of many important aspects of proper dog maintenance. Some dog owners prefer to groom their animals themselves, while others use the service of professional animal groomers. In order to easily handle a dog while grooming, the groomer often places the dog on a table set at a comfortable working height. Many dogs will not stay in place for prolonged periods of time without the use of some form of restraint, especially while being groomed with brushes, trimmers, and similar tools. Additionally, some dogs may feel particularly threatened or unconformable during the grooming process, causing them to become aggressive. This not only makes the grooming process difficult, but can be dangerous for the groomer if there is a risk of the dog responding by attacking the groomer.

In order to address this issue, many grooming tables come equipped with a vertical pole that extends upward from the table surface. A locking groomer's loop is secured to the dog are attached to a rope, which is then attached to the pole. Some groomers use a clamp designed to be attached to the pole and secured to the loose end of a dog's leash. However, many of these clamps can be cumbersome to use and difficult to readjust when dealing with a moving animal. Accordingly, a dog grooming clamp designed to be attached to a grooming pole while allowing for easy securing and adjustment of a rope therein is desired.

SUMMARY OF THE INVENTION

In view of the foregoing disadvantages inherent in the known types of dog grooming clamps now present in the known art, the present invention provides a dog grooming clamp wherein the same can be utilized for providing convenience for the user when wishing to secure a dog to a table for grooming purposes. The present system comprises a base member, two parallel and opposing arms extending therefrom, and a third arm perpendicularly attached to a first arm having a threaded aperture disposed thereon. A hollow channel extends along the entire length of base member. A handle is pivotally attached to a second arm and is designed to push a pin into the channel when rotated in a first direction, such that when a rope is inserted within the channel, the pin pushes the rope against the channel, locking it in place. The rope can be released by rotating it in an opposing direction. A threaded rod is placed within the threaded aperture and can be used to attach the dog grooming clamp to a pole.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
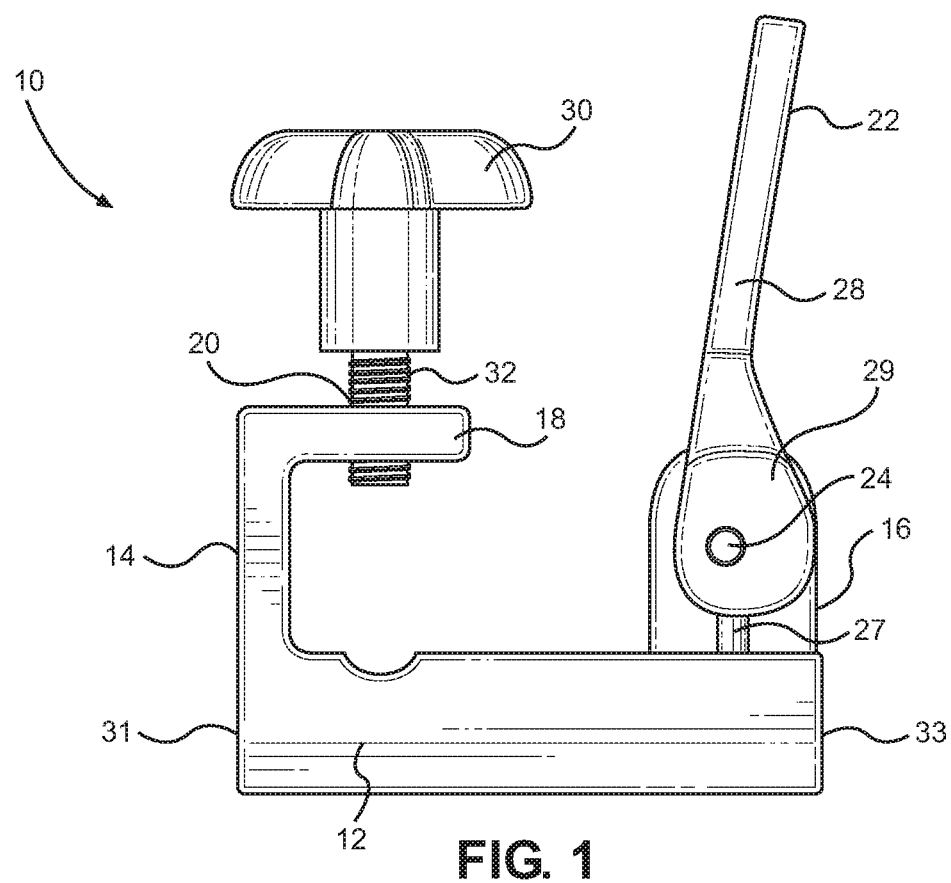
FIG. 1 shows a side elevational view of one embodiment of the dog grooming clamp

Reference is made herein to the attached drawings. Like reference numerals are used throughout the drawings to depict like or similar elements of the dog grooming clamp. The figures are intended for representative purposes only and should not be considered to be limiting in any respect.

Figure 2:
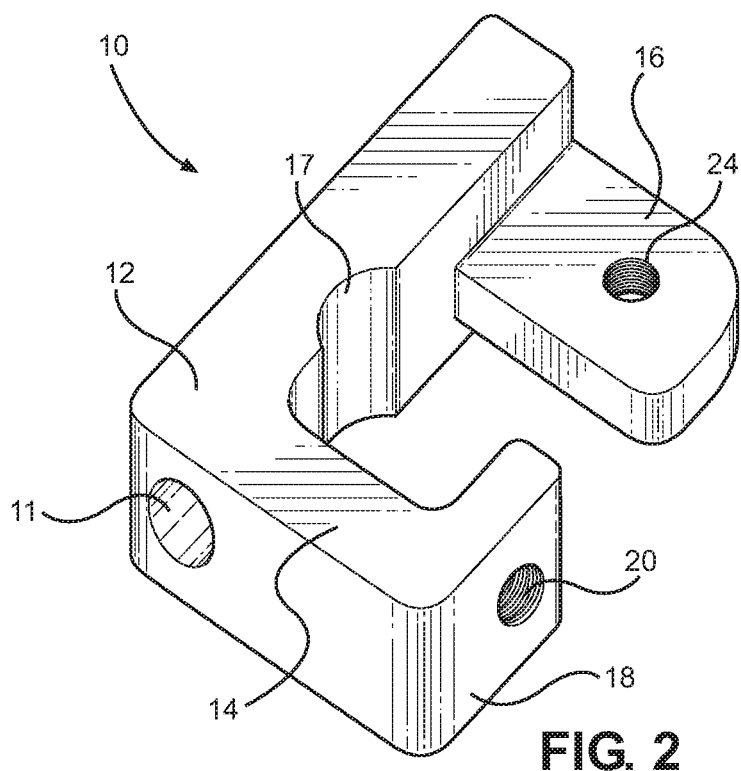
FIG. 2 shows a perspective view of the base unit of the dog grooming clamp.

Referring now to FIGS. 1 and 2, there is shown a side elevational view of one embodiment of the dog grooming clamp and a perspective view of the base unit of the dog grooming clamp, respectively. The dog grooming clamp 10 comprises a base member 12 with a first end 31 and a second end 33. A first arm 14 is disposed at the first end 31 and extends perpendicular therefrom, and a second arm 16 is disposed at the second end 33 and extends perpendicular therefrom. The second arm 16 is positioned parallel to and opposite from the first arm 14.

A third arm 18 is positioned perpendicular to the first arm 14 and extends parallels to and opposite the base member 12. A knob 30 is connected to a threaded bolt 32 and placed within an aperture 20 having a threaded interior surface that is positioned on the third arm 18 and extends therethrough. The threading of the aperture 20 is configured to match the threading of the rod, such that the threaded rod 32 can be securely inserted therein. In some embodiments of the dog grooming clamp 10, a notch 17 is positioned in the base member 12 opposite the threaded aperture 20. The notch 17 runs along an entire width of the base member 12. The notch has a curved or semi-circular shape and is dimensioned to secure the outer diameter of a pole, such as those used in dog grooming tables. Thus, as the threaded rod 32 is advanced through the threaded aperture, it can frictionally engage a pole between the notch 17 and the end of the threaded rod 32, suspending the dog grooming clamp 10 in place.

A handle 22 having an elongated section 22 and a wider base 29 is pivotally secured to the second arm 16. In some embodiments, the handle 22 is attached to the second arm 16 via a central hinge 24 extending through the wider base 29. The handle 22 is operably connected to a channel disposed within the base member 12 that is adapted to receive a rope therein. The handle 22 may be selectively actuated to lock and release the rope to the dog grooming clamp 10.

Figure 3:
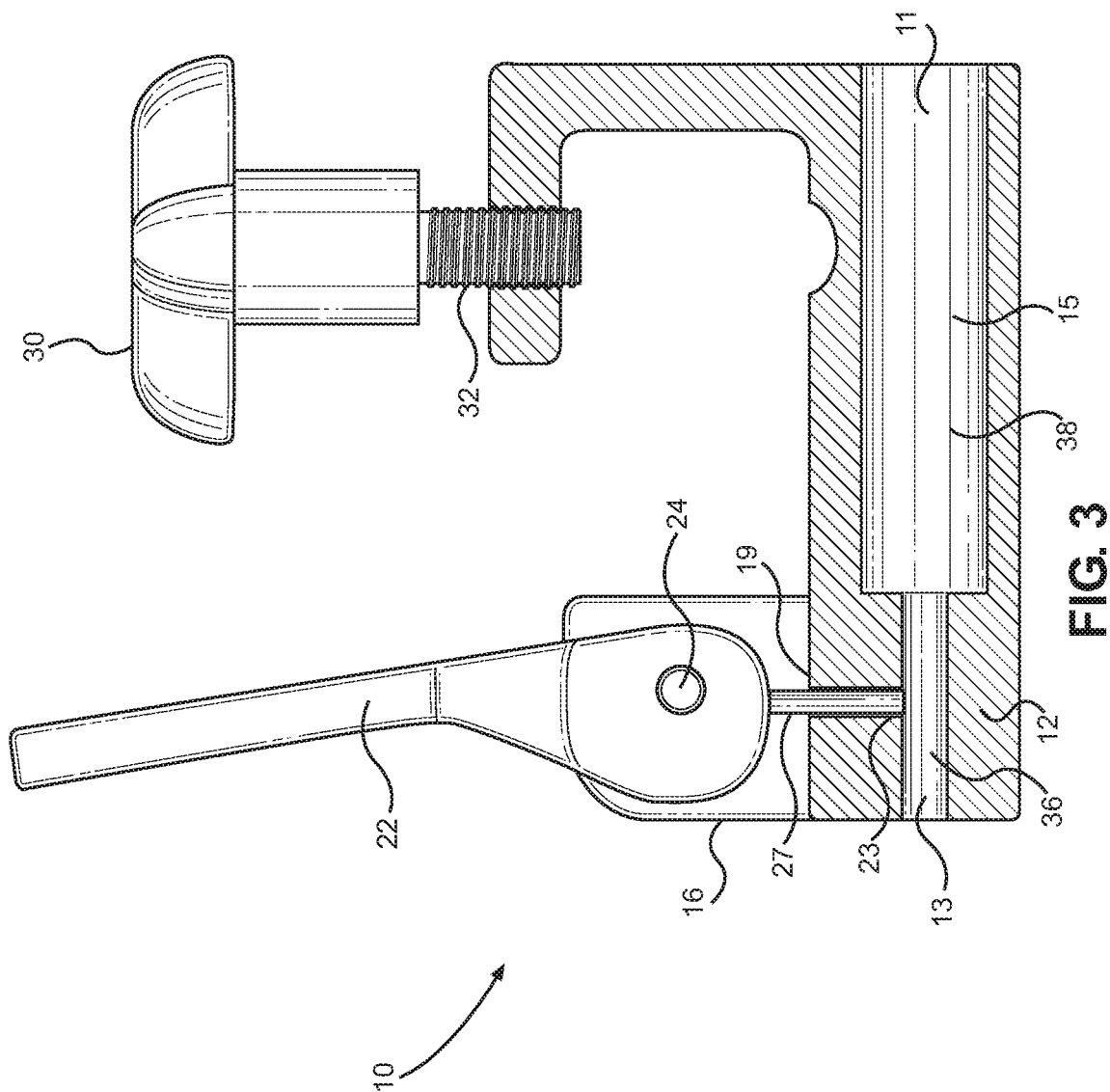
FIG. 3 shows a side elevational cut away view of the dog grooming clamp.

Referring now to FIG. 3, there is shown a side elevational cut away view of the dog grooming clamp. A channel 15 disposed within the base member 12 is adapted to receive a rope therethrough, so as to removable secure the rope to the base member 12. In the shown embodiment, the channel 15 extends through the entire length of the base member 12, having a first opening 11 and a second opening 13. The channel 15 comprises two diameters, wherein the first section 38 adjacent to the first opening 11 is larger than the second section 36 adjacent to the second opening 13. In some embodiments, the first section 38 is configured to have a large object inserted therein. The change in diameter between the first and second sections 38, 36 prevents objects having a dimension greater that the second section, but smaller than the first section from passing therethrough. For example, many ropes used for grooming purposes have a bolt snap hook attached to one end to easily secure the rope to a locking groomer's loop. Accordingly, the larger diameter of the first section allows for a rope to be pulled farther through the channel by accommodating the bolt snap hook within the first section 38.

A passageway 23 extends from the second section 36 to an upper surface 19 of the base member 12 adjacent handle 22. A pin 27, operably connected to the handle 22, is placed within the passageway 23 and is dimensioned to easily slide therein. The pin 27 is movable through the passageway 23 via actuation of the handle 22 between an open and closed position. In an open position, the pin 27 is retracted within the passageway 23 allowing unobstructed movement of a rope within the channel 15. In the closed position, the pin 23 extends into the channel 15, preventing the rope from sliding within the channel 15. In one embodiment, the pin 27 frictionally engages with the rope to prevent movement its movement within the channel 15. In some embodiments of the dog grooming clamp 10, the pin 27 is biased toward the handle 22. For example, a spring may be placed within the passageway 23 and exert a force on the pin 27, moving it away from the second section 36. This ensures that the second section 36 of the channel 15 remains unobstructed when no opposing force is applied to the pin 27, allowing for a rope to slide easily therethrough.

Figure 4:
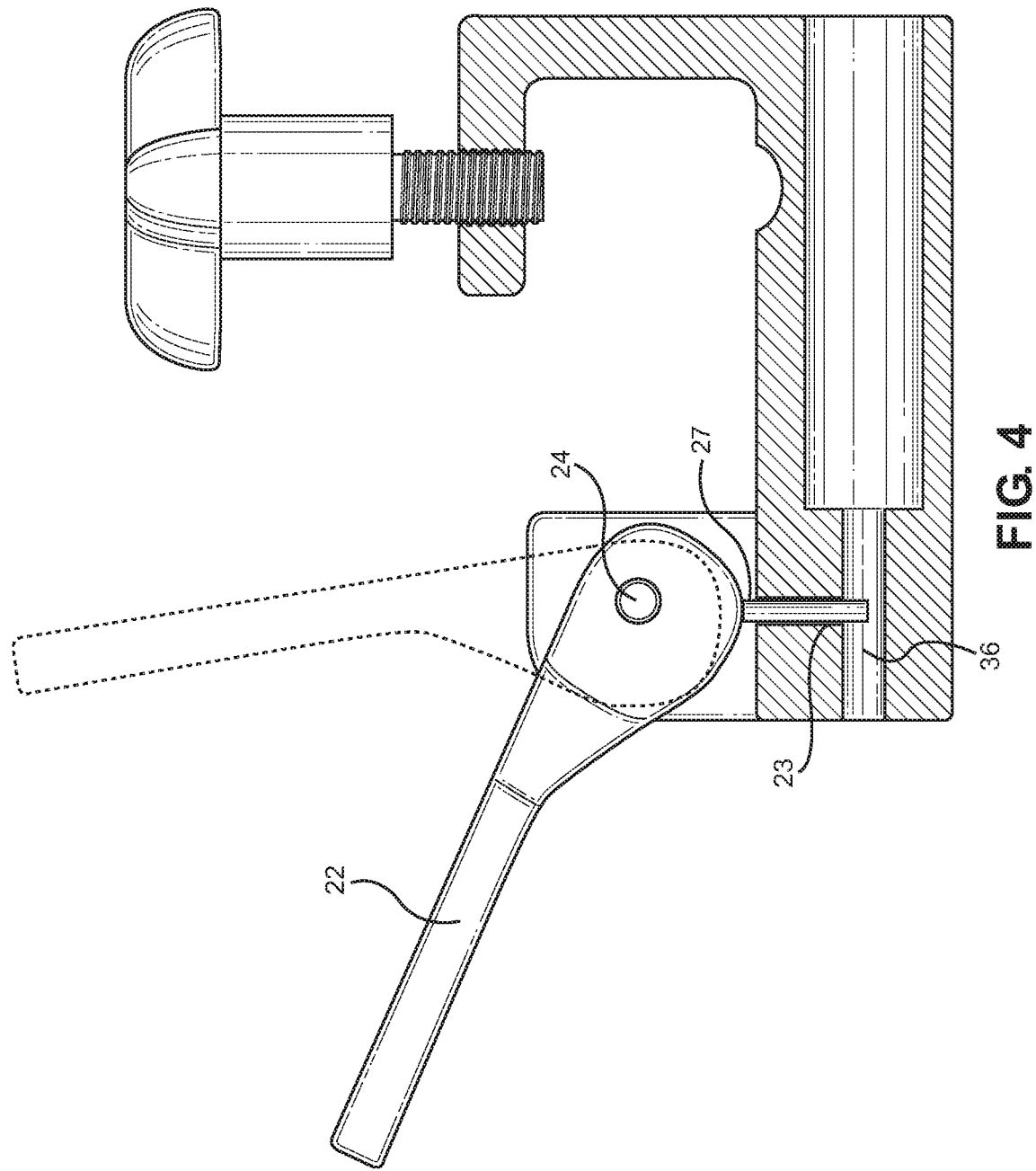
FIG. 4 shows a side elevation cut away view of the dog grooming clamp with the handle in an open and a closed position.

Referring now to FIG. 4, there is shown a side elevation view of the dog grooming clamp with the handle in an open positive position and a closed positive position. The handle 22 is secured to the second arm 16 such that the pivot point of the central hinge 24 is off center relative to the wider base of the handle 22, a configuration that provides a quick release mechanism. When the handle 22 is rotated, a portion of the wider base pushes the pin 27 downward into the passageway 23, wherein the end of the pin 27 opposite the handle 22 extends into the second section 36 of the channel.

When a rope is placed within the channel and the handle is rotated in a first direction, the pin 7 pushed into the second section 36 of the channel 15, piercing the rope. The handle 22 and the pin 27 remain in place due to the friction force between the rope and the pin 27 without requiring any additional securing method. This allows for a user to quickly release the rope when so desired by rotating the handle 22 in the opposite direction, which can be particularly useful when handling an active dog that may require multiple attempts to be secured in a specific position.

Figure 5:
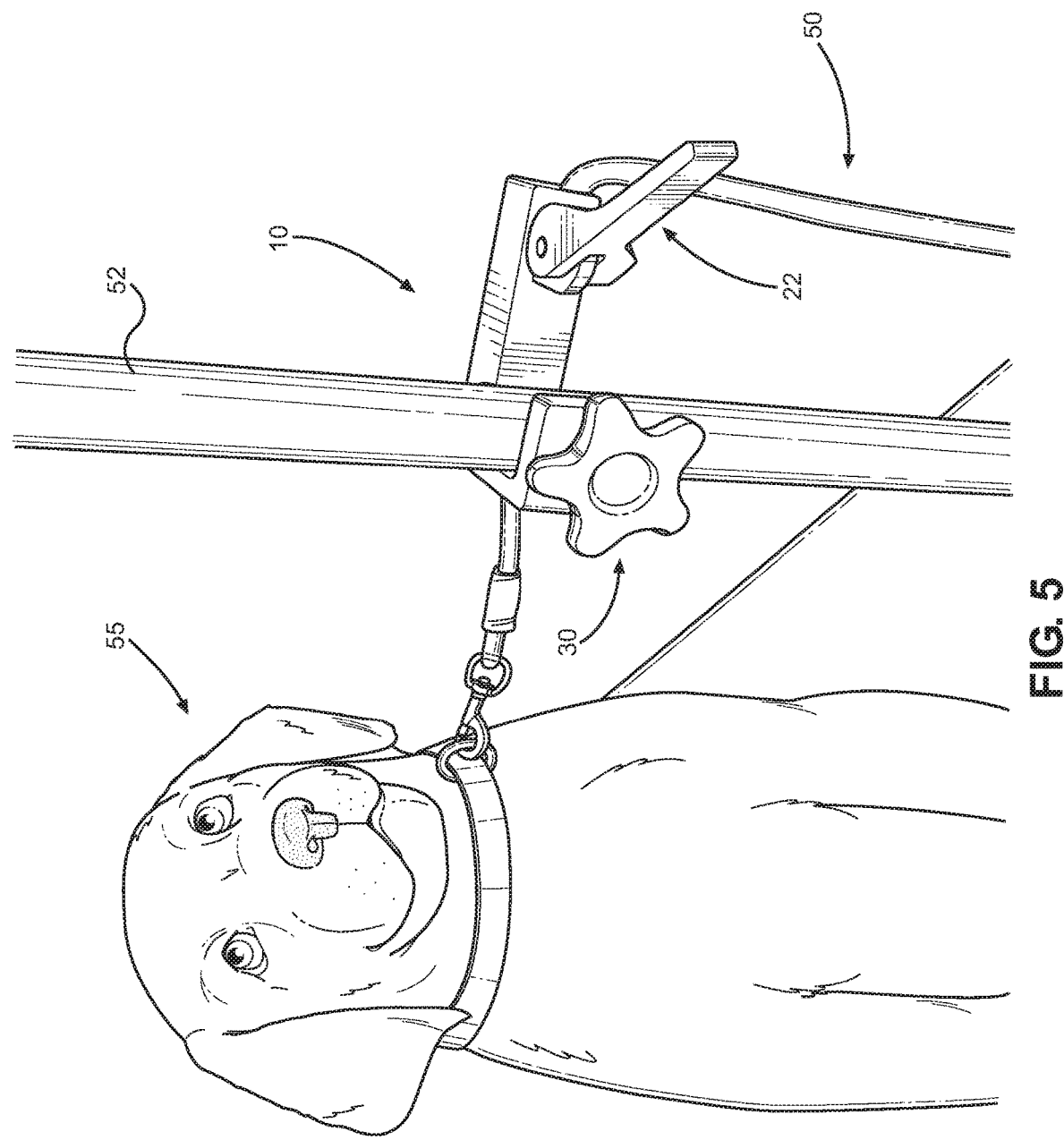
FIG. 5 shows a perspective view of the dog grooming clamp in use while secured to a grooming pole.

Referring now to FIG. 5, there is shown a perspective view of the dog grooming clamp in use at a grooming stand. The dog grooming clamp 10 is mounted onto a pole 52, such as the vertical poles attached to grooming tables of dog groomers, by placing the pole between the threaded rod and the notch. The knob 30 of the threaded rod is rotated until the pole 52 is securely wedged between one end of the threaded rod and the notch. A groomer may choose to position the handle 22 away from a dog to reduce the dog's ability to reach the groomers hands while handling the grooming bracket 10.

In some embodiments of the dog grooming clamp 10, a rope 50 is permanently positioned within the channel, extending from the first opening to the second opening. The end of the rope comprises hook that can easily be attached to a locking groomer's loop. When the dog is at a desired position, the handle 22 is rotated such that the wider base of the handle pushes the pin into the second section of the channel and pinches the rope, locking it into position. Should the groomer decide to reposition or release the rope, the handle 22 is rotated in the opposite direction, releasing the pin and allowing the rope to be adjusted accordingly.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A dog grooming clamp, comprising:
   a base member comprising a first end and a second end with an upper surface, wherein a first arm extends from the first end of the upper surface and a second arm extends from the second end of the upper surface;
   a channel extending through the base member, the channel comprising a first section that abuts and is axially aligned with a second section, the first section having a first uniform diameter that is larger than a second uniform diameter of the second section, the first section having a planar interior surface that surrounds an interior opening of the second section;
   a third arm extending perpendicular from the first arm, positioned opposite and parallel to the base member;
   an aperture with a threaded rod disposed therein, the aperture disposed on the third arm and comprising a threaded interior surface adapted to be securely engaged with the threaded rod;
   a passageway with a pin disposed therein, the pin operably connected to an actuatable handle that causes the pin to move between an open and closed position to selectively and frictionally engage with a received rope within the second section of the channel to control coupling therebetween.

2. The dog grooming clamp of claim 1, further comprising a notch within the upper surface of the base member, aligned with and positioned opposite the aperture.

3. The dog grooming clamp of claim 2, wherein the notch comprises a curved shape.

4. The dog grooming clamp of claim 1, wherein the threaded rod further comprises a knob attached to one end thereof.

5. The dog grooming clamp of claim 1, wherein the channel extends the entire length of the base member.

6. The dog grooming clamp of claim 1, wherein the channel comprises a first section and a second section, the first section having a diameter larger than the second section.

7. The dog grooming clamp of claim 6, wherein the passageway extends from the second section of the channel to the upper surface of the base member.

8. The dog grooming clamp of claim 1, wherein the handle further comprises an elongated section and a wider base, wherein the handle is attached to the second arm at a pivot point that is disposed off center of the wider base.

9. The dog grooming clamp of claim 1, wherein the pin is fully retracted within the passageway in an open configuration.

10. The dog grooming clamp of claim 1, wherein the pin extends into the channel preventing the rope from sliding within the channel in a closed configuration.

11. The dog grooming clamp of claim 8, wherein a portion of the wider base pushes the pin downward into the passage when the handle is rotated.

* * * * *